(12) United States Patent
Tran et al.

(10) Patent No.: US 7,158,490 B1
(45) Date of Patent: Jan. 2, 2007

(54) APPARATUS, AND ASSOCIATED METHOD, FOR EFFECTUATING POWER CONTROL OF A COMMUNICATION DEVICE

(75) Inventors: Jean-Marie Tran, San Diego, CA (US); Antti Kansakoski, San Diego, CA (US)

(73) Assignee: Nokia Mobile Phones Limited, Espo (FI)

( * ) Notice: Subject to any disclaimer, the term of this patent is extended or adjusted under 35 U.S.C. 154(b) by 0 days.

(21) Appl. No.: 09/399,687

(22) Filed: Sep. 21, 1999

Related U.S. Application Data

(60) Provisional application No. 60/101,258, filed on Sep. 21, 1998.

(51) Int. Cl.
*H04B 7/185* (2006.01)
*H04B 7/216* (2006.01)

(52) U.S. Cl. .................... 370/318; 370/342; 455/69; 455/522

(58) Field of Classification Search ................ 370/310, 370/311, 318, 320, 335, 342, 441; 455/69, 455/226, 421, 522, 430; 375/144, 148
See application file for complete search history.

(56) References Cited

U.S. PATENT DOCUMENTS

| | | | | |
|---|---|---|---|---|
| 4,495,648 A | | 1/1985 | Giger et al. | |
| 5,187,808 A | * | 2/1993 | Thompson | 455/518 |
| 5,193,216 A | * | 3/1993 | Davis | 455/67.7 |
| 5,444,862 A | * | 8/1995 | Hibino | 455/504 |
| 5,799,005 A | | 8/1998 | Soliman et al. | |
| 5,839,056 A | * | 11/1998 | Hakkinen | 455/69 |
| 6,034,952 A | * | 3/2000 | Dohi et al. | 370/335 |
| 6,044,277 A | * | 3/2000 | Tsuda | 455/522 |
| 6,070,074 A | * | 5/2000 | Perahia et al. | 455/430 |
| 6,137,788 A | * | 10/2000 | Sawahashi et al. | 370/342 |
| 6,154,659 A | * | 11/2000 | Jalali et al. | 455/522 |
| 2003/0130004 A1 | * | 7/2003 | Esmailzadeh et al. | 455/522 |

FOREIGN PATENT DOCUMENTS

WO WO 94/18756 A 8/1994

* cited by examiner

*Primary Examiner*—Ricky Q. Ngo
*Assistant Examiner*—Gregory B. Sefcheck
(74) *Attorney, Agent, or Firm*—Alston & Bird LLP

(57) ABSTRACT

Power control apparatus, and an associated method, for controlling communication signals generated during operation of a communication system, such as an IS-953G cellular communication system. Determinations are made as to whether a communication channel upon which communication signals are transmitted exhibits a deep fade condition. If a determination of a deep fade condition is made, power control is effectuated to reduce the power levels of communication signals subsequently transmitted on the communication channel.

19 Claims, 3 Drawing Sheets

APPARATUS, AND ASSOCIATED METHOD, FOR EFFECTUATING POWER CONTROL OF A COMMUNICATION DEVICE

CROSS REFERENCE TO RELATED APPLICATION

This application claims the benefit of U.S. Provisional Application No. 60/101,258, filed on 21 Sep. 1998.

The present invention relates generally to a manner by which selectably to control power levels of signals generated during operation of a communication system, such as a cellular communication system. More particularly, the present invention relates to closed-loop, power control apparatus, and an associated method, by which selection is made to not increase the power level at which a signal is transmitted if channel conditions are determined to be beneath a minimum threshold. If channel conditions are so poor that an increase in power levels of signals transmitted upon the communication channel would not appreciably improve communication quality, selection is made not to increase, or even to decrease, transmitted power levels.

BACKGROUND OF THE INVENTION

Communication through the use of wireless communication systems has achieved wide popularity in recent years. Multi-user, wireless communication systems of improved capabilities have been implemented as a result of advancements in communication technologies. Communication pursuant to such multi-user, wireless communication systems can be affordably made, further increasing the popularity of usage of such systems.

In a wireless communication system, a communication channel formed between a sending station and a receiving station is a radio channel defined upon a portion of the electromagnetic spectrum. Because a radio channel forms a communication link, a wireline connection is not required to be formed between the sending and receiving stations to permit the communication of information between the stations. Communication by way of a wireless communication system is thereby permitted at, and between, locations at which the formation of a wireline connection would not be possible. Also, because a communication channel is formed of a radio channel, a radio communication system can be more economically installed as the infrastructure costs associated with a wireline communication system are significantly reduced.

A cellular communication system is exemplary of a wireless, multi-user radio communication system which has been made possible due to advancements in communication technologies and which has achieved wide levels of usage. A cellular communication system efficiently utilizes the portion of the electromagnetic spectrum allocated thereto. A plurality of fixed-site base stations are installed throughout a geographical area. By transmitting relatively low-power signals, the same frequencies can be reused at different locations throughout the geographical area. Thereby, communications can be effectuated between more than one set of sending and receiving stations concurrently at separated locations throughout the area encompassed by the cellular communication system. Controlling the power levels at which signals generated during operation of a cellular communication system is important to minimize co-channel interference of concurrently-generated communication signals.

Various standards have been promulgated relating to various types of cellular communication systems, and various types of cellular communication systems have been constructed corresponding to such standards. The IS-95 and IS-98 interim standards, promulgated by the EIA/TIA, are exemplary of standards which pertain to a cellular communication system utilizing CDMA (code division multiple access) communication techniques. In a CDMA communication system, a plurality of concurrently-generated communication signals are generated concurrently upon a common channel. When such a communication scheme is utilized, the power levels of such communication signals must be regulated better to achieve optimal capacity.

Various standards are also being proposed for a so-called third-generation (3G), cellular communication system. Proposed standards predicated upon CDMA also set forth a scheme by which to regulate power levels of communication signals generated in such a system, referred to as a IS-95 3G system.

The interim standards and proposed IS-95 3G standard set forth, inter alia, requirements for closed-loop, power control in a cellular communication system constructed pursuant to such standard. And, more generally, because of the need to control power levels of signals generated during operation of a CDMA communication system, closed-loop power control schemes are advantageously implemented in such, as well as other, systems. In an exemplary closed-loop, power control scheme, power control bits are generated and transmitted by network infrastructure on a forward link channel to a mobile station. The power control bit is used, once received at the mobile station, to control the power levels at which reverse link communication signals are generated by the mobile station. Two-way power control can be effectuated in which power control bits are generated at the mobile stations, transmitted to the base station and used to control the power levels of signals generated on a forward link.

The radio communication channels upon which communication signals, including control information, such as the power control bits, must be communicated between the network infrastructure and a mobile station exhibit multi-path characteristics. That is to say, a signal actually received at, e.g., a mobile station, is actually a summation of the same signal transmitted by way of various different transmission paths to the mobile station. The same signal is received at the radio telephone, albeit at various time delays, as a result of such multi-path transmission. Analogously, multi-path characteristics also are exhibited upon an uplink channel upon which signals are transmitted by the mobile station.

Multi-path conditions on the communication channel might cause communication quality degradation, resulting in signal fading. Other communication system conditions might also result in signal fading. And, fading of the communication signal as the signal is transmitted upon the communication channel might prevent its accurate detection at its destination.

To counteract signal fading, closed-loop power control is utilized to cause power levels of signals communicated upon the communication channel to be increased. In the aforementioned CDMA system, e.g., power control bits transmitted to the mobile station are used by the mobile station to select the power levels of signals generated by the mobile station on the reverse link channel. In a two-way, power control scheme, power control bits transmitted to the mobile station are used at the base station to control the power levels of signals transmitted therefrom.

By increasing the power levels of the signals communicated on such channel, signal degradation, due to fading is, ideally, overcome. However, in the event of severe fading conditions, any reasonable power level increase in the power levels of the signals communicated on the communication channel would not result in appreciable communication quality increase. In other words, channel conditions might be so poor that increasing the power levels of the transmitted signals would not result in communication quality improvement.

Increasing the power level of the communication signal might also adversely affect communication qualities of other communication signals transmitted at the same time upon other channels. In the aforementioned, CDMA system, for instance, channels are defined by unique codes, and a plurality of signals are generated at the same time upon a common bandwidth. A signal, when received at a destination, must be decoded. Other signals transmitted upon the common bandwidth are considered to be noise. And, the power levels of such other signals, considered to be noise, must not be so high as to interfere with proper detection and decoding of the desired signal. Signals generated in a CDMA communication system of high power levels are therefore particularly likely to adversely affect communication qualities of other signals generated at the same time.

As noted above, increase in the power level of a communication signal in an attempt to overcome fading is ineffective to improve communication quality levels in deep fading conditions. And, because such an increase in power levels might adversely affect the communication qualities of other communications, care must be exercised when increasing the power levels of the communication signal.

A manner by which to effectuate power control which takes into account a determination whether a power level increase would benefit communication quality would therefore be advantageous.

It is in light of this background information related to communications by way of a non-ideal communication channel that the significant improvements of the present invention have evolved.

SUMMARY OF THE INVENTION

The present invention, accordingly, advantageously provides power-control apparatus, and an associated method, for effectuating power control in a communication system in which communication signals are transmitted upon non-ideal communication channels.

Power levels of communication signals transmitted upon a communication channel are increased only subsequent to a determination that an increase would result in a communication quality improvement. If a determination is made that a power level increase would not significantly improve communication quality, the power levels of the communication signal are selected to be not increased, or even decreased. Thereby, power level increases are effectuated only if such increase would result in communication quality level improvement.

Determination of a communication quality channel quality indicia is made. Responsive to the determination, selection is made whether to increase power levels of the signal. If the channel quality indicia indicates that an increase in power levels would benefit communication quality, the power levels are increased. If, conversely, the channel quality indicia indicates that an increase in power levels would not benefit communication quality the power levels are not increased.

In one aspect of the present invention, power control is effectuated in a cellular radio telephone operable in a CDMA cellular communication system, such as that proposed to be constructed pursuant to the IS-95 3G system. Proposals for the IS-95 3G standard set forth requirements for fast power control on a forward link extending between a base station and a mobile station. More particularly, proposals have been set forth for the mobile station to request either an increase, or decrease, of power levels at which signals shall be transmitted upon its traffic channel. Requests are to be made every 1.25 ms, i.e., at a 800 Hz refresh rate. The fast power control, forming, a closed loop between a base station and mobile station, acts to limit gain variation, e.g., in a range of plus or minus 10 dB.

In one aspect of the present invention, control apparatus is implemented at the mobile station to detect when the traffic channel formed between the base station and mobile station exhibits a deep fade condition. When such a condition is detected, power down commands are transmitted to the base station to cause the power levels of signals subsequently transmitted to be reduced.

Because an increase in power levels of the signals would still be insufficient to maintain appropriate communication quality levels, e.g., to permit demodulation of the signal, the power levels are, instead, decreased. Such decrease reduces interference to other signals generated at the same time over the common bandwidth, thereby to permit an increase of system capacity.

In one implementation, detection of a deep fade condition is made subsequent to generation, at the mobile station, of a selected plurality of successive power up commands. For instance, if the power control step of each power up command is 1 dB and the power control range is 20 dB, a deep fade condition is defined to be detected responsive to twenty successive power up commands.

In another implementation, detection of a deep fade condition is made responsive to comparisons between a receive pilot signal strength relative to a moving, or fixed, average of the receive pilot signal strength. For instance, if the comparison is a value of less tan 10 dB, a deep fade condition is defined to be detected.

In yet another implementation, detection of a deep fade condition is made responsive to comparison between a first, or second, derivative of the pilot signal strength with respect to time and a selected threshold. A large negative value of the derivative of the pilot signal strength, in dB, is characteristic of a deep fade condition.

During operation of an embodiment of the present invention, once a deep fade condition detection is made by the mobile station, a selected number of power down commands are generated by the mobile station. Thereafter, the power control loop is effectively disabled, such as by generating a series of mixed power-up and power-down commands. Re-enablement of the power control loop is thereafter made when the deep fade condition is no longer detected.

In one implementation, a deep fade condition is detected to have ended when, e.g., signal strength levels are determined to have increased, as detected at the mobile station. In an implementation in which pilot signal strength is compared to an averaged value of pilot signal strength, when the pilot signal strength increases to be greater than a selected threshold, the deep fade is detected to have ended. And, when a derivative of the pilot signal strength is utilized to detect a deep fade condition, a change in direction, i.e., sign, of the derivative indicates the end of a deep fade condition.

In these and other aspects, therefore, apparatus, and an associated method, is provided for selectively controlling power levels of a communication signal generated by a sending station of a communication system. The sending station sends the communication signal upon a communication channel to a receiving station. The communication channel is susceptible to fading. A determiner is coupled to receive indications of the communication signal, once transmitted upon the communication channel and received at the receiving station. The determiner determines at least when fading exhibited by the communication channel upon which the communication signal is sent cause fading of the communication signal beyond a selected threshold. A power controller is coupled to receive indications of determinations made by the determiner. The power controller selectively provides power control change indications to the sending station. The power control change indications are of levels not to cause an increase in power levels of the communication signal if the determiner determines the fading of the communication signal to be beyond the selected threshold.

A more complete appreciation of the present invention and the scope thereof can be obtained from the accompanying drawings which are briefly summarized below, the following detailed description of the presently-preferred embodiments of the invention, and the appended claims.

DETAILED DESCRIPTION

Figure 1:
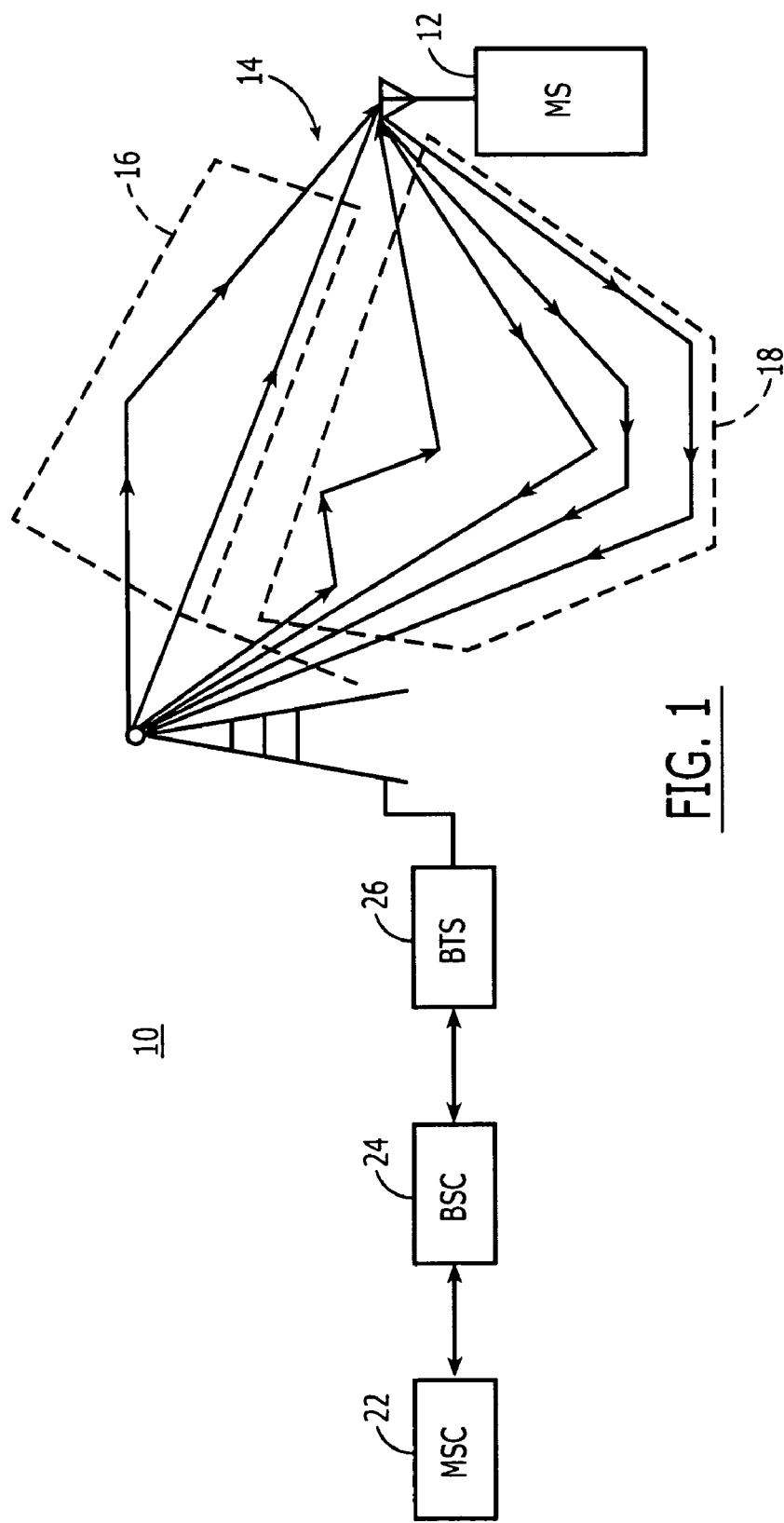
FIG. 1 illustrates a functional block diagram of an exemplary communication system in which an embodiment of the present invention is operable.

Turning first to FIG. 1, an exemplary communication system, shown generally at 10, provides for communication with a mobile station 12 by way of a radio link 14. The exemplary communication system 10 shown in the Figure is representative of a CDMA cellular communication system, e.g., a system to be defined in a proposal for the IS-95 3G (third generation) standard. An embodiment of the present invention is analogously also operable in other types of radio, as well as other, communication systems. And, while the exemplary communication system provides for two-way traffic channels upon the radio link, here a forward link channel 16 and a reverse link channel 18, the power control provided pursuant to an embodiment of the present invention shall be described with respect to communication signals transmitted upon the forward link. Power control can analogously be described with respect to the reverse link.

The communication system 10 includes network infrastructure, here shown to include an MSC (mobile switching center) 22. The MSC 22 is coupled to a BSC (base station controller) 24 which, in turn, is coupled to a BTS (base transceiver station) 26. The BTS 26 defines a cell of the communication system 10 within which communication signals transmitted by the BTS 26 transmitted upon a forward link channel can be received by a mobile station 12, and within which communication signals transmitted by the mobile station 12 can be received by the BTS 26. Two-way communication is thereby effectuated with the mobile station 12 by way of a radio air interface which defines the radio link 14 between the network infrastructure and the mobile station 12.

As noted previously, communication signals generated for transmission upon the radio air interface formed between the network infrastructure and the mobile station must be of appropriate power levels both to ensure that transmitted signals are of signal levels permitting their detection when received and also to ensure that the signal level does not interfere with other concurrently-transmitted communication signals. In a CDMA cellular communication system, as well as in other radio communication systems, power control bits are returned by a receiving station to a sending station to request an increase, or decrease in power levels of subsequently transmitted signals. Thereby, close-loop power control is effectuated by which to control the power levels at which signals are communicated in the communication system.

For instance, power control bits transmitted by the network infrastructure to the mobile station are used by the mobile station to select power levels at which signals are transmitted upon the reverse link. And power control bits transmitted by the mobile station to the network infrastructure are used by the network infrastructure to select power levels at which signals are subsequently transmitted upon the forward link. Thereby, closed loop power control is effectuated on both the reverse and forward links.

Figure 2:
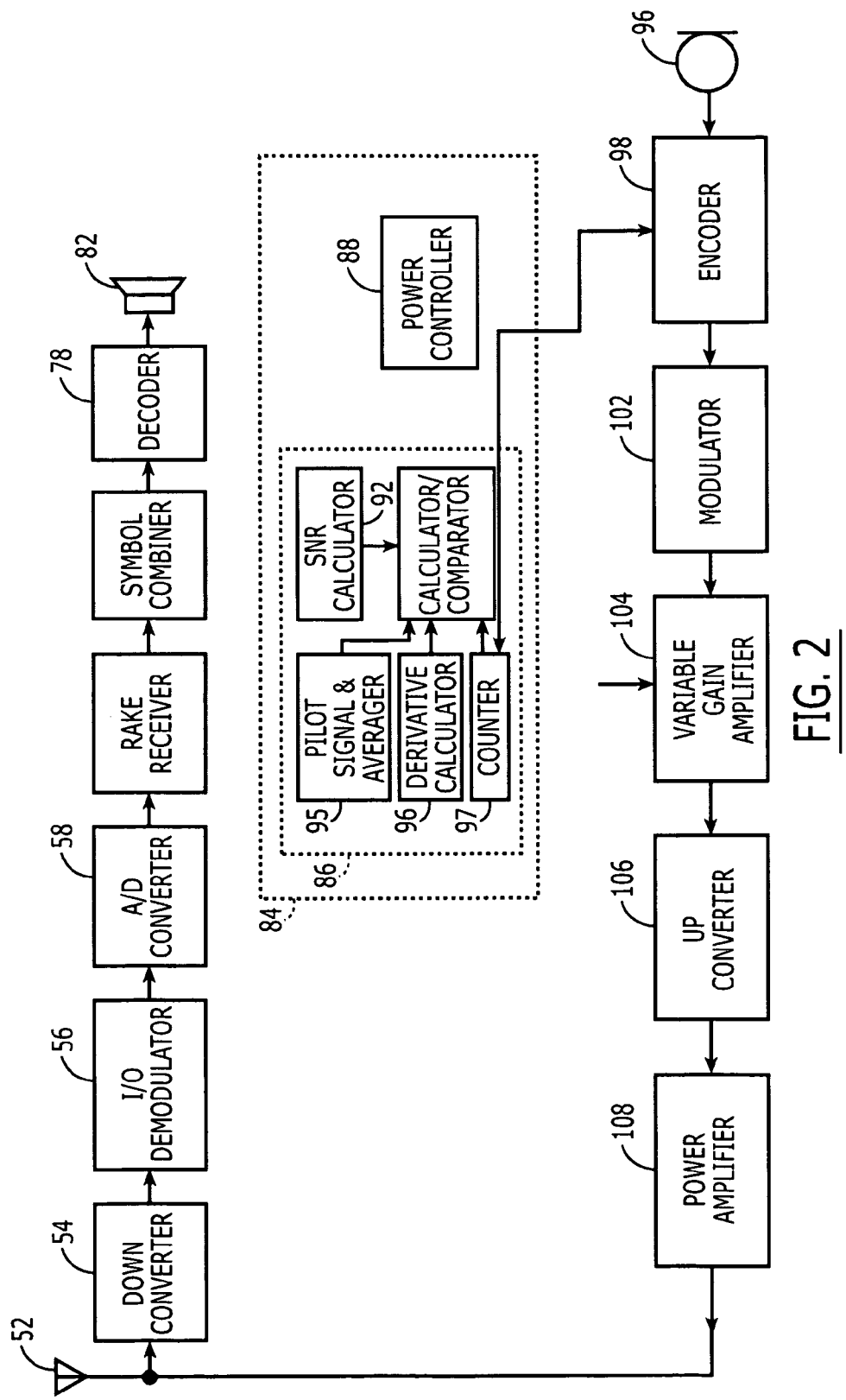
FIG. 2 illustrates a functional block diagram of a mobile station in which an embodiment of the present invention forms a portion thereof.

The radio link defined by the radio air interface between the network infrastructure and at the mobile station, however, sometimes exhibits multi-path propagation. The forward and reverse links thereby define multi-path channels. Multi-path propagation on such channels might result in signal fading upon the channels. Other conditions might also cause signal fading when fading is significant, a receiving station is unable to accurately recreate the informational content of the transmitted signal. When a channel exhibits significant fading, the channel is referred to as exhibiting a deep fade condition FIG. 2 illustrates the mobile station 12, shown previously in FIG. 1, and here operable pursuant to an embodiment of the present invention. In conventional manner, the mobile station is selectively tuned to a forward link channel to receive communication signals generated by the network infrastructure. The forward link channel shall herein refer both to a traffic channel and a non-traffic channel. Electromagnetic signals representative of transmitted signals upon a forward link channel are detected by the antenna transducer 52, converted into electrical form, and provided to a multi-stage down converter 54. This down converter 54 is here operable to down-convert the signals provided thereto to base band level and to provide a base band signal to an IQ demodulator 56. The demodulator generates a I- and Q- demodulated signals which are applied to an analog-to-digital converter 58. The converter 58 converts the signals applied thereto into digital form and provides such digitized signals to a rake receiver 62.

While not separately shown, the rake receiver 62 includes a plurality of dynamically-assigned fingers. Symbols detected by the fingers are combined by a symbol combiner 66. A decoder 78 is coupled to the symbol combiner 66 and is operable to decode, e.g., signals representative of traffic information and to provide such symbols, once decoded, to an acoustic, or other, transducer 82.

A mobile station 12 further includes a controller 84, formed of an ASIC (application specific integrated circuit), processing device, or combination thereof. The controller 84 includes functional elements which are operable pursuant to an embodiment of the present invention. Here, the controller is shown to include a determiner 86 and a power controller 88. The determiner is coupled to the receive portion of the mobile station 12 to receive indications of signals detected by the receive portion of the mobile station. And, the power controller 88 is coupled to the determiner to receive indications of the determiner to receive indications of determinations thereat.

The determiner is operable to determine whether the forward link channel exhibits a deep fade condition responsive to the indications of signals detected by the receive portion of the mobile station and provided to the determiner. If a determination is made by the determiner that the forward link channel exhibits a deep fade condition, an indication is provided to the power controller 88. The power controller is operable responsive thereto to cause the mobile station to generate a power control request requesting a reduction in power levels of subsequently transmitted communication signal by the network infrastructure to the mobile station.

The determiner is further operable to determine when the forward link channel subsequently no longer exhibits the deep fade condition. When such a determination is subsequently made, indications are also provided to the power controller 88. The power controller 88 is thereafter, responsive thereto, to resume normal power control operations to request increase, or decrease, of subsequently generated signals to be transmitted by the network infrastructure on the forward link channel. Through operation of an embodiment of the present invention, therefore, if an increase in power levels of a signal would not appreciably improve communication quality levels, the power level at which the communication signal is transmitted is selected to be reduced in power. Thereby, communication quality of other communications are improved.

In one implementation, and as illustrated, the determiner includes a signal-to-noise ratio (SNR) calculator 92 coupled to received indications of signal strength levels of communication signals transmitted by the network infrastructure to the mobile station and also to receive indications of corresponding noise levels. The SNR calculator 92 calculates a signal-to-noise ratio, and provides an indication of the ratio calculated thereat to a calculator/comparator 94. The calculator/comparator compares the calculated ratio with a selected threshold value. If the signal-to-noise ratio is not greater than the selected threshold, the communication channel is determined to exhibit a deep fade condition. An indication of such determination is provided to the power controller.

As noted above, the power controller 88 is thereafter operable to request that the power levels of the communication signal be reduced. Even during deep fade conditions, measurements are continued to be made of the signal-to-noise ratios. When the ratio returns to be of a value at least as great as the selected threshold, a determination is made that the channel no longer exhibits a deep fade condition. And, the power controller is informed of the new determination and normal operations resume.

In another embodiment, indications of a signal strength of a pilot signal generated by network infrastructure and broadcast to a mobile station, such as the mobile station 12, are provided to a pilot strength calculator and averager 95. Indications of the signal strength of the pilot signal together with an average value over time are provided to the calculator/comparator 94. If ratios of the pilot signal strength relative to its average value over time is less than a selected threshold, as compared by the comparator 94, a determination is made that the communication channel exhibits a deep fade condition. And, indication of the determination is provided to the power controller 88. The power controller, responsive thereto, requests that subsequent communication signals transmitted to the mobile station be of reduced power levels, again until a determination is subsequently made that the communication channel no longer exhibits a deep fade condition.

In another implementation, and also as illustrated in the Figure, a derivative calculator 96 is utilized to calculate a first, or second, derivative of the pilot signal strength. Indications of the calculator derivative are provided to the calculator/comparator 94. The calculator/comparator 94 compares the calculator derivative with a selected value, such as a selected negative value. If the calculated value of the derivative is beyond, for instance, or more negative than the selected value, a determination is made that the communication channel exhibits a deep fade condition. An indication is provided to the power controller 88 to cause a request to be made that the power level of signals subsequently transmitted to the mobile station be reduced in power at least for the duration of the deep fade condition.

In another implementation, also illustrated in the Figure, a counter 97 maintains a count of power-up commands generated by the power controller to request power level increases. If a selected number of power-up increase requests are successively generated, a deep fade condition on the communication channel is determined to be exhibited. Count values provided by the counter 97 are provided to the calculator/comparator. If a selected number, for example, twenty successive power-up commands are generated by the power controller 88, a determination is made that the communication channel exhibits a deep fade condition. Results of the determination are provided to the power 88, and the power controller generates power-down requests to reduce the power levels of communication signal subsequently transmitted by the network infrastructure.

In an exemplary implementation, combinations of separate manners by which to determine the presence of a deep fade condition on the communication channel are utilized, together to determine the existence of the deep fade condition.

The transmit portion of the mobile station 12 is here shown to include a transducer, here a microphone 98, an encoder 100 coupled to the microphone 98 and also to the controller to encode signals provided thereto, and a modulator 102, coupled to the encoder 100 and operable to modulate the encoded signals provided thereto. The transmit portion of the mobile station is further shown to include a VGA (variable gain amplifier) 104, operable to amplify the modulated signal formed by the modulator 102, a multistage up converter 106 for up converting the amplified signal, and a power amplifier 108 for amplifying the up-converted signal.

Figure 3:
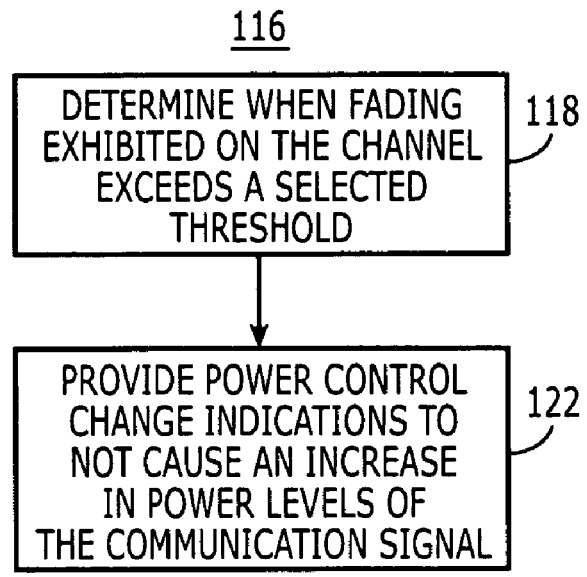
FIG. 3 illustrates a method flow diagram listing the method steps of the method of an embodiment of the present invention.

FIG. 3 illustrates a method, shown generally at 116, of an embodiment of the present invention. The method selectively controls power levels of a communication signal sent by a sending station upon a communication channel to a receiving station. First, and as indicated by the block 118, a determination is made, responsive to indications of the communication signal transmitted upon the communication channel and received at the receiving station at least when fading exhibited by the communication channel causes fading of the communication signal beyond a selected threshold. Then, and as indicated by the block 122, power control change indications are selectively provided to the sending station. The power control change indications are of levels not to cause an increase in power levels of the communication signal only if the fading of the communication signal is determined to be beyond the selected threshold.

Through operation of an embodiment of the present invention, when a determination is made that channel conditions are so poor that an increase in power levels of signals transmitted upon a communication channel would not appreciably improve communication quality, a selection is made to decrease the transmitted power levels of the signals, at least for a selected period.

The circuitry shown in FIG. 2 which forms the mobile station is analogous to circuitry which forms a portion of a base station of an embodiment of the present invention. When the circuitry shown in FIG. 2 forms a portion of a base station, power control bits transmitted upon a channel are received at the base station and are utilized at the base station to effectuate power control on the downlink, in like fashion as that described with respect to effectuation of power control at the mobile station.

Through operation of an embodiment of the present invention, therefore, the value of the power control bit is retrieved and used for power control purposes as soon as the delay spread is determined. Because an arbitrary time period is not required to expire prior to such determination, the power control bit is able to be used more quickly to effectuate power control. And, through operation of an embodiment of the present invention, because adjustment to the timing alignment of the mobile station is limited to the starts of power control groups, such timing adjustment is made without interfering with delay spread determinations.

The previous descriptions are of preferred examples for implementing the invention, and the scope of the invention should not necessarily be limited by this description. The scope of the present invention is defined by the following claims.

We claim:

1. Closed loop power control apparatus for a communication system having a sending station and a receiving station, the sending station for sending a communication signal upon a communication channel, to the receiving station, the communication channel susceptible to fading and the sending station and the receiving station positioned in a closed-loop power-control feedback control arrangement, said closed loop power control apparatus for selectively controlling power levels of the communication signal sent by the sending station, said power control apparatus comprising:
   a determiner embodied at the receiving station and coupled to receive indications of the communication signal, once transmitted upon the communication channel and received at the receiving station and to receive indications of power control change indications previously sent to the sending station, the determiner for determining, at least when fading exhibited by the communication channel upon which the communication signal is beyond a selected threshold, the fading exhibited by the communication channel determined to be beyond the selected threshold when a selected number of successive power control change indications request increase in the power levels of the communication signal; and
   a power controller also embodied at the receiving station and coupled to receive indications of determinations made by said determiner, said power controller for selectively providing power control change indications of levels responsive to determinations made by said determiner to the sending station, the power control change indications forming requests requesting an increase, or decrease, in power levels of the communication signal when subsequently sent by the sending station upon the communication channel, the power control change indications of levels that request the power levels of the communication signal, subsequently to be sent by the sending station, not to be increased if the determiner determines the fading of the communication signal to be beyond the selected threshold.

2. The power control apparatus of claim 1 wherein said determiner is coupled to receive indications of both a signal strength of the communication signal and noise levels of noise, said determiner for determining a signal-to-noise ratio and, responsive to a value of the signal-to-noise ratio less than a selected value, for determining the fading exhibited by the communication channel to be beyond the selected threshold.

3. The power control apparatus of claim 1 wherein said determiner is further for determining, subsequent to determining when the fading exhibited by the communication channel is beyond the selected threshold, when the fading exhibited by the communication channel returns to be within the selected threshold, said determiner for determining the fading to be within the selected threshold responsive to the value of a signal-to-noise ratio returning to be greater than a selected value.

4. The power control apparatus of claim 3 wherein said power controller further provides power control change indications to the sending station to request an increase in power levels of the communication signal when the fading exhibited by the communication channel returns to be within the selected threshold.

5. The power control apparatus of claim 1 wherein said determiner is further for determining, subsequent to determining when the fading exhibited by the communication channel is beyond the selected threshold, when the fading exhibited by the communication channel returns to be within the selected threshold.

6. The power control apparatus of claim 5 wherein said power controller further provides power control change indications to the sending station to permit an increase in power levels of the communication signal when the fading exhibited by the communication channel returns to be within the selected threshold.

7. The power control apparatus of claim 1 wherein a pilot signal is further broadcast by the sending station to the receiving station and wherein said determiner is coupled to receive indications of both a signal strength of the pilot signal and an average value of the signal strength of the pilot signal, said determiner for comparing the indications of the signal strength of the pilot signal with the indications of the average value to form a comparison therebetween, said determiner for determining the fading exhibited by the communication channel to be beyond the selected threshold when the comparison is less than a selected level.

8. The power control apparatus of claim 1 wherein a pilot signal is further broadcast by the sending station to the receiving station and wherein said determiner is coupled to receive indications of a derivative of signal strength of the pilot signal, said determiner for determining the fading exhibited by the communication channel when the derivative is at least a selected negative value.

9. The power control apparatus of claim 1 wherein said power controller further provides at least one power control change indication to the sending station to request a decrease in the power levels of the communication signal if the determiner determines the fading of the communication signal if the determiner determines the fading of the communication signal to be beyond the selected threshold.

10. The power control apparatus of claim 9 wherein said power controller provides a selected plurality of power control change indications to the sending station to request the decrease in the power levels of the communication signal by a selected magnitude of power level decrease.

11. The power control apparatus of claim 10 wherein, subsequent to providing the selected plurality of power control change indications to the sending station, said power controller provides subsequent power control change indications to the sending station to maintain the decrease in the power levels of the communication signal to be of the selected magnitude of power level decrease.

12. The power control apparatus of claim 1 wherein the communication system comprises of CDMA (code division multiple access) communication system, wherein the sending station comprises a base station of network infrastructure of the cellular communication system, wherein the receiving station comprises a mobile station and wherein said determiner is located at the mobile station.

13. The power control apparatus of claim 12 wherein at least a portion of said power controller is located at the mobile station.

14. The power control apparatus of claim 12 wherein the communication channel comprises a forward-link traffic channel and wherein said determiner determines whether the forward link traffic channel exhibits a deep fade condition.

15. A closed-loop power control method for selectively controlling power levels of a communication signal sent by a sending station upon a communication channel to a receiving station, the communication channel susceptible to fading and the sending station and the receiving station positioned in a closed-loop power-control feedback control arrangement, said method comprising:

determining at the receiving station, responsive to indications of the communication signal once transmitted upon the communication channel and received at the receiving station and responsive to power control change indications previously sent to the sending station, at least when fading exhibited by the communication channel upon which the communication signal is beyond a selected threshold, the fading exhibited by the communication channel determined to be beyond the selected threshold when a selected number of successive power control change indications request increase in the power levels of the communication signal;

selectively forming power control change indications to the sending station responsive to determinations made during said operation of determining, the power control indications of levels forming requests requesting an increase, or decrease, in power levels of the communication signal when subsequently sent upon the communication channel, the power control change indications of levels that request the power levels of the communication signal, subsequently to be sent, not to be increased if the fading of the communication signal determined during said operation of determining is determined to be beyond the selected threshold; and returning the power control change indications selectively formed during said operation of selectively forming, to the sending station.

16. The method of claim 15 wherein the power control change indications, sent during said operation of selectively forming power control change indications, are of levels to cause a decrease in the power levels of the communication signal if the fading is determined to be beyond the selected threshold.

17. The method of claim 15 comprising the additional operations of:

subsequently determining when fading exhibited by the communication channel no longer causes fading of the communication signal beyond the selected threshold; and re-enabling normal power control change indications to the sending station.

18. The method of claim 15 wherein the sending station comprises a base station of a cellular communication system and the receiving station comprises a mobile station and wherein said operations of determining, selectively forming, and returning are performed at the mobile station.

19. Closed loop power control apparatus for a communication system having a sending station and a receiving station, the sending station for sending a communication signal upon a communication channel susceptible to fading and the sending station and the receiving station positioned in a closed-loop power-control feedback control arrangement, said closed loop power control apparatus for selectively controlling power levels of the communication signal sent by the sending station, said power control apparatus comprising:

a determiner embodied at the receiving station and coupled to receive indications of the communication signal and to receive indications of a derivative of signal strength of the pilot signal, once transmitted upon the communication channel and received at the receiving station, the determiner for determining, at least when fading exhibited by the communication channel upon which the communication signal is beyond a selected threshold and for determining the fading exhibited by the communication channel when the derivative is at least a selected negative value; and a power controller also embodied at the receiving station and coupled to receive indications of determinations made by said determiner, said power controller for selectively providing power control change indications of levels responsive to determinations made by said determiner to the sending station, the power control change indications forming requests requesting an increase, or decrease, in power levels of the communication signal when subsequently sent by the sending station, not to be increased if the determiner determines the fading of the communication signal to be beyond the selected threshold.

\* \* \* \* \*